United States Patent [19]

Yaginuma et al.

[11] Patent Number: 5,019,326
[45] Date of Patent: May 28, 1991

[54] PELLET HANDLING AND EXTERNAL INSPECTION EQUIPMENT

[75] Inventors: Yoshitaka Yaginuma; Motohide Tokiya; Naoya Saito, all of Ibaraki, Japan

[73] Assignee: Mitsubishi Nuclear Fuel Co., Tokyo, Japan

[21] Appl. No.: 437,015

[22] Filed: Nov. 16, 1989

[30] Foreign Application Priority Data

Nov. 16, 1988 [JP] Japan .............................. 63-289499
Nov. 9, 1989 [JP] Japan .............................. 1-292027

[51] Int. Cl.$^5$ .............................................. G21C 21/02
[52] U.S. Cl. .............................. 376/261; 53/504; 209/618
[58] Field of Search ............... 376/261, 260, 245, 248; 53/244, 504, 532, 542; 209/538, 586, 618, 654; 198/385, 386, 387; 414/146, 789.6; 29/723, 906

[56] References Cited

U.S. PATENT DOCUMENTS

| | | | |
|---|---|---|---|
| 3,576,189 | 4/1971 | Lorenz et al. | 53/244 |
| 3,709,328 | 1/1973 | Mohr et al. | 209/586 |
| 4,037,103 | 7/1977 | Ryden, Jr. | 250/359.1 |
| 4,056,200 | 11/1977 | Provost | 53/542 |
| 4,193,502 | 3/1980 | Marmo | 376/261 |

FOREIGN PATENT DOCUMENTS 131099  6/1988  Japan .............................. 376/261

*Primary Examiner*—Daniel D. Wasil
*Attorney, Agent, or Firm*—Cushman, Darby & Cushman

[57] ABSTRACT

The present invention provides a pellet handling equipment for conveying pellets. The pellet handling equipment is essentially composed of a first roller device, a second roller device, and a pellet supplying device. The first roller device is supported generally horizontal and rotatable about an axis thereof for a rotation in a predetermined direction. The second roller device is disposed parallel and adjacent to the first roller device, supported rotatable about an axis thereof for a rotation in a same direction with the first roller device. The second roller device is provided with a slot formed in a circumferential surface thereof and extending in the axial direction. The slot is capable of receiving each one of the pellets. The pellet supplying device intermittently supplies the pellets to the first and second roller device. Each of the intermittently supplied pellets is supported by the first and second roller device therebetween so that the axis of the pellet is parallel to the axes of the first and second roller device. Then, the pellet is rotated about an axis thereof as the first and second roller device rotate, trapped in the slot of the second roller device, and conveyed to the side opposite to the first roller device.

16 Claims, 18 Drawing Sheets

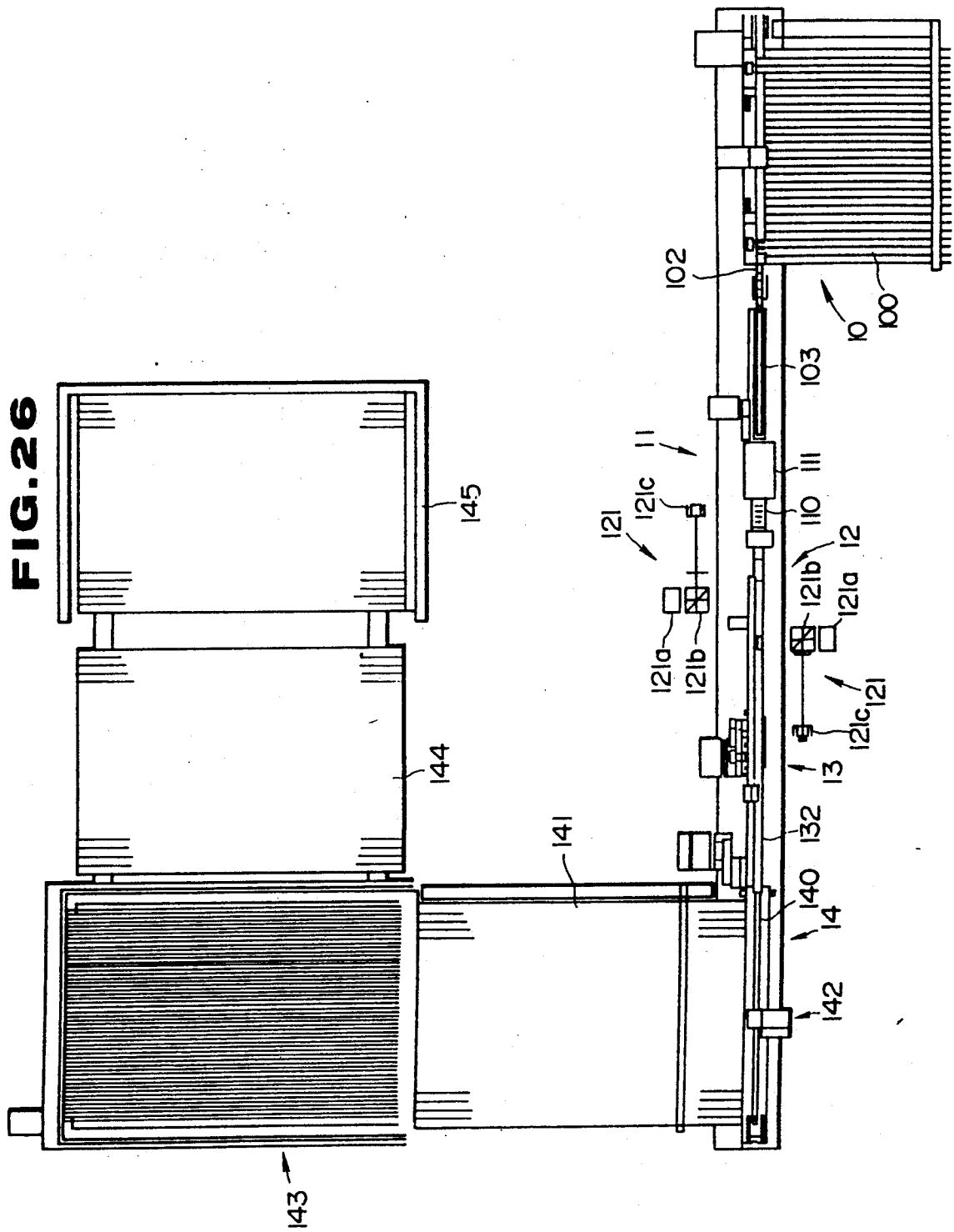

PELLET HANDLING AND EXTERNAL INSPECTION EQUIPMENT

BACKGROUND OF THE INVENTION

1. Field of the Invention

The field of the present invention relates to a mechanical apparatus for handling pellets and the like, as well as examining the external appearance of the handled material.

2. Prior Art

In general, pellets to be loaded into nuclear fuel rods are manufactured by molding green compacts of uranium dioxide and similar nuclear fuel powders into a cylindrical form, then sintering. Because defects may develop on the surface of the pellets during the manufacturing process, it is necessary that they be inspected.

In the past, inspection of such pellets has been carried out by visual examination by inspection personnel. During this inspection, pellets with surface flaws are removed. With such a method, however, it is necessary that each sintered pellet be individually examined in order to obtain reliable results. Such an inspection method is quite laborious and considerably inefficient, and furthermore, places considerable demands on the inspection personnel.

With this in mind, various types of imaging equipment for examining the surfaces of the pellets have been proposed. With such methods, however, elaborate pellet handling devices are required to handle the pellets. Thus visualization and throughput of the pellets at a sufficiently high rate has not yet been achieved.

SUMMARY OF THE INVENTION

With the above described limitations of the prior art in mind, an object of the present invention is to provide an apparatus which can rapidly and smoothly rotate a pellet or the like about its axis while otherwise maintaining it in a fixed position, then eject the handled object. Furthermore, it is another object of the present invention to provide an apparatus which can inspect the surface of the pellet or other object while it is rapidly handled. Further objects of the present invention will become clear through the description of the preferred embodiments.

To achieve the above objectives, the present invention provides a pellet handling apparatus equipped successively with a cylindrical roller and a slotted transfer roller which can freely rotate in the same direction. Furthermore, along with a pellet supply unit which is provided to supply pellets between the above mentioned cylindrical roller and the slotted transfer roller, a pellet transfer unit is provided at the above mentioned slotted transfer roller.

Similarly, the present invention provides an external inspection apparatus which includes a circumferential surface inspection unit added to the above described assembly by which means the external circumferential surface of a pellet placed between the above mentioned cylindrical roller and slotted transfer roller may be inspected. Also included is a defective pellet discard unit as part of the above mentioned pellet discard unit by which means pellets judged to be defective by the above mentioned circumferential surface inspection unit are discharged.

Moreover, the present invention as recited in claim 3 provides an external inspection apparatus in which a direction switching assembly is included on the first part of the above mentioned pellet supply unit, whereby the direction in which the pellet is conveyed is switched from the axial direction of the pellet to a direction perpendicular thereto. Also provided is a drying—rough sorting apparatus which dries and sorts the pellets after the above described switch in direction, and on this drying—rough sorting apparatus, an end surface inspection unit by which means the ends of the sorted pellets may be inspected. On the last portion of the above mentioned pellet discard unit, a pellet gathering assembly is provided to collect the pellets.

The above described direction switching assembly includes a buffer tray upon which the pellets are placed arranged along their axes in multiple columns, as well as a pickup unit by which means the pellets on the buffer tray are grasped on their circumferential surface and conveyed.

The above described drying—rough sorting apparatus includes a revolving conveyer unit by which means the pellets are rotated about their longitudinal axes while they are conveyed in a direction perpendicular to their longitudinal axes and a drying unit mounted on the revolving conveyer unit, and mounted on the rear portion of the drying unit, a rough sorting apparatus by which means the circumferential surfaces of the pellets are imaged from above and sorted on the basis of said image.

The above mentioned end surface inspection unit has an intermittently rotating conveyer disk with pellet receiving grooves in its outer circumferential surface. While received in the grooves, each end of each pellet is independently imaged, and on the basis of these images, the pellets are judged as acceptable or not acceptable by means of an end surface evaluation unit. The end surface inspection unit also includes a defective pellet discard unit by which means pellets judged defective by the end surface evaluation unit are discarded.

The above mentioned pellet gathering assembly includes a pellet placing unit which places and lines up a plurality of the pellets aligned in a direction perpendicular to their longitudinal axes. The pellet gathering assembly also includes an end surface pickup unit by which means the placed and aligned pellets are grasped by their end surfaces and conveyed.

For the pellet handling equipment of the present invention as claimed in claim 1, the pellets are supplied from the pellet supply unit and are placed between the cylindrical roller and the slotted transfer roller which rotate in the same direction, and the pellets are thereby caused to revolve in this position. When the slotted transfer roller rotates to the position where its transfer slot meets the pellet, the pellet is received by the slot.

For the external inspection apparatus of the present invention as claimed in claim 2, the pellets are supplied from the pellet supply unit and are placed between the cylindrical roller and the slotted transfer roller which rotate in the same direction, and while the pellets revolve in this position, their circumferential surfaces are inspected by the circumferential surface inspection unit. Those pellets judged to be defective are then discarded by the pellet discard unit.

For the external inspection apparatus of the present invention as claimed in claim 3, through the action of a direction switching apparatus, the direction in which the pellets are conveyed is switched from the axial direction of the pellets to a direction perpendicular to the circumferential surface of the pellets. The pellets are then dried and rough sorted by means of the drying—rough sorting apparatus, after which the ends of the sorted pellets are inspected by means of the end surface inspection unit. The pellets are then placed between the cylindrical roller and the slotted transfer roller which rotate in the same direction, and while the pellets revolve in this position, their circumferential surfaces are inspected by the circumferential surface inspection unit. Those pellets judged to be defective are then discarded by the pellet discard unit while those judged as suitable collected by the pellet gathering assembly.

With the above mentioned direction switching apparatus, the pellets are aligned in multiple columns on buffer trays, and through the action of a circumferential surface pickup unit, the pellets on the buffer tray, one from each column, are grasped on their circumferential surface and conveyed.

The previously mentioned drying—rough sorting apparatus includes a revolving conveyer unit over which the pellets proceed in a direction perpendicular to their longitudinal axes while rotating about their longitudinal axes. As the pellets are conveyed, they are dried by the drying unit, and then through the action of the rough sorting unit, their circumferential surfaces are imaged. On the basis of the obtained images, the pellets are sorted as acceptable and defective.

In the previously described end surface inspection unit, the pellets are received in grooves in the intermittently rotating conveyer disk, and while received in the grooves, the ends of the pellets are imaged, and on the basis of the images, the pellets are judged as acceptable or not acceptable by means of an end surface evaluation unit. Those pellets judged defective are then discarded by a defective pellet discard unit.

With the above mentioned pellet gathering, the pellets are lined up in a direction perpendicular to their longitudinal axes by the pellet placing unit, after which a plurality of the pellets are grasped by means of the end surface pickup unit by their end surfaces and conveyed.

BRIEF DESCRIPTION OF THE DRAWINGS

FIG. 26 is plan view of the external inspection apparatus employed in the second preferred embodiment of the present invention shown in FIG. 25.

DETAILED DESCRIPTION OF THE PREFERRED EMBODIMENTS OF THE PRESENT INVENTION

In the following, a first preferred embodiment of the present invention will be described with reference to FIGS. 1 through 13.

Figure 4:
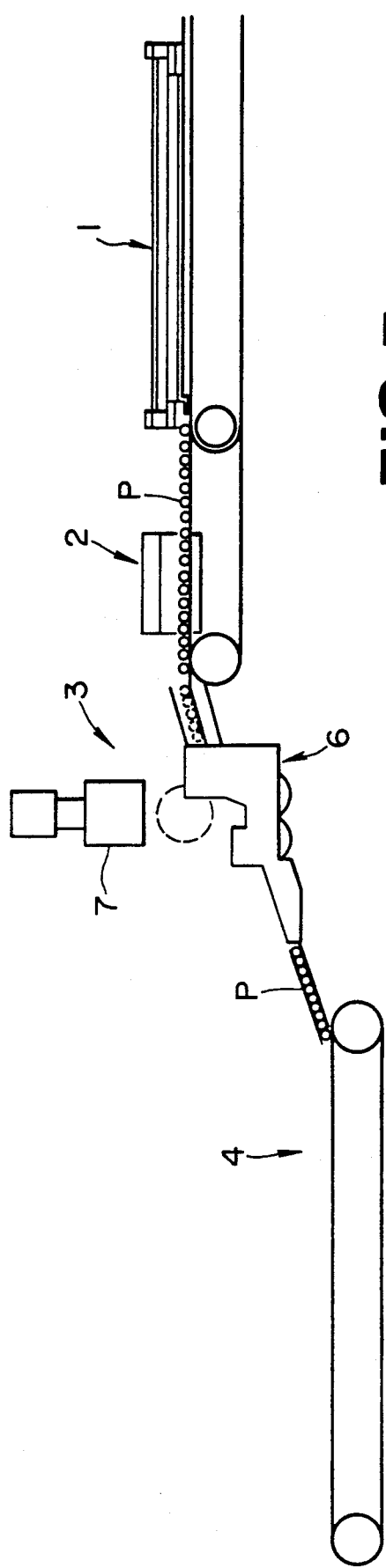
FIG. 4 is a front elevation of the external inspection apparatus included with the pellet handling apparatus shown in FIG. 1.
Figure 5:
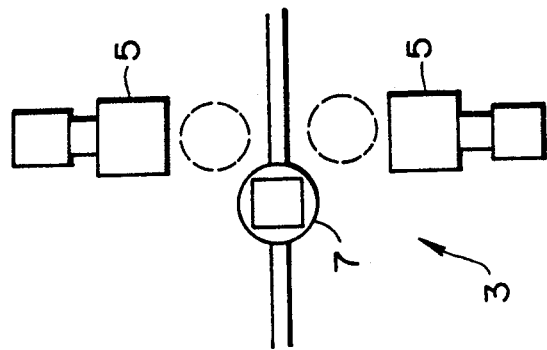
FIG. 5 is a plan view of the external inspection apparatus shown in FIG. 4.

As shown in FIG. 4, the external inspection apparatus is comprised of successively, from right to left, a direction switching assembly 1, a drying unit 2, an external inspection unit 3, a pellet stacker 4. By virtue of the direction switching assembly 1, the cylindrical pellets P which up to entering that apparatus having been moving in a line along their longitudinal axes, are flipped so that their longitudinal axes are now perpendicular to their initial position. The pellets are then dried in the drying unit 2 after which both of the pellets end surfaces are imaged by the paired end surface imaging units 5, shown in FIG. 5. After this, the pellets are caused to rotate about their longitudinal axes by the pellet handling apparatus 6 of the present invention, and during the course of this rotation, the circumferential surfaces of the pellets are imaged by the circumferential imaging unit 7. Based on the results of the above described imaging steps, only those pellets judged to be normal are sent on to the above mentioned pellet stacker 4.

Figure 1:
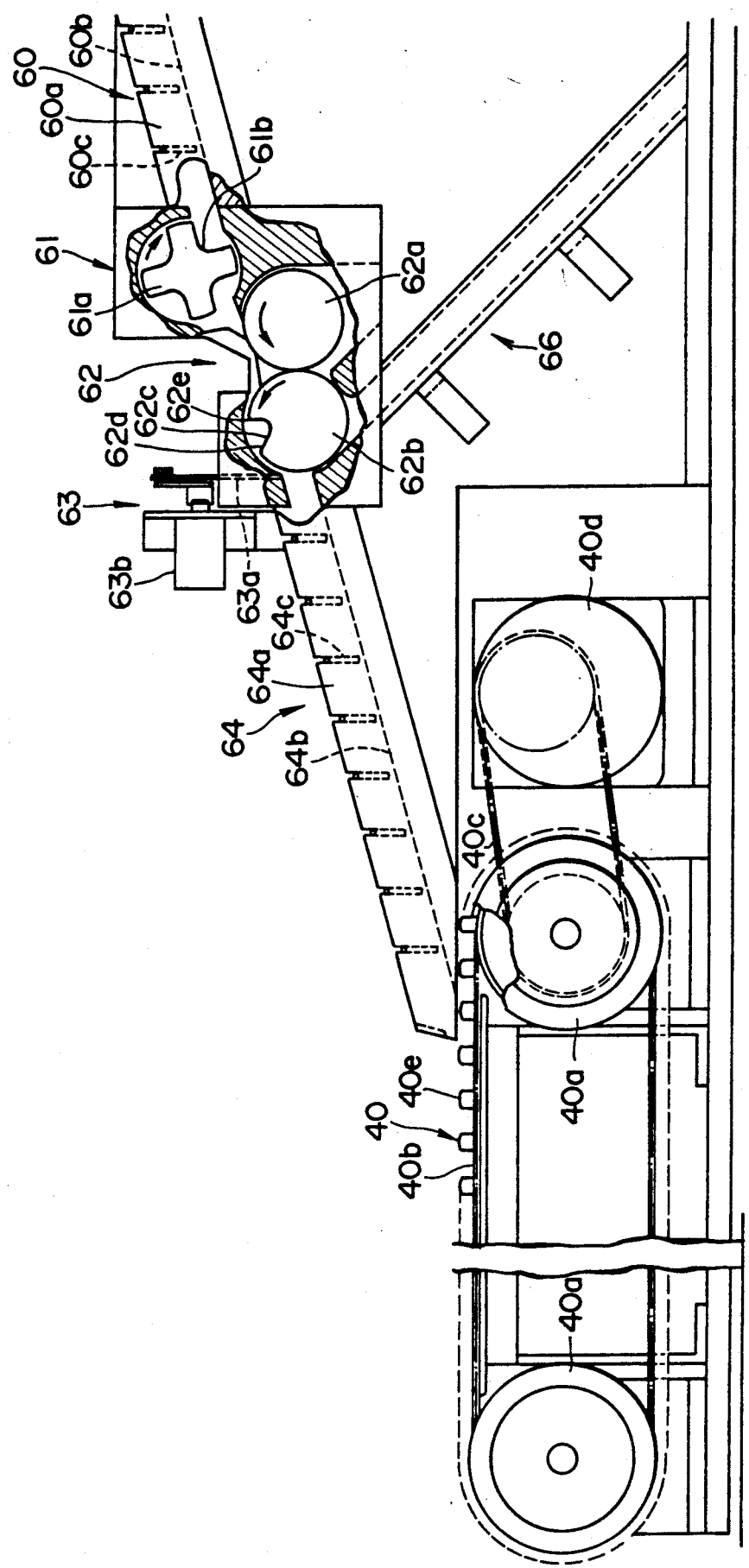
FIG. 1 is a front elevation of a pellet handling apparatus of the first preferred embodiment of the present invention.
Figure 2:
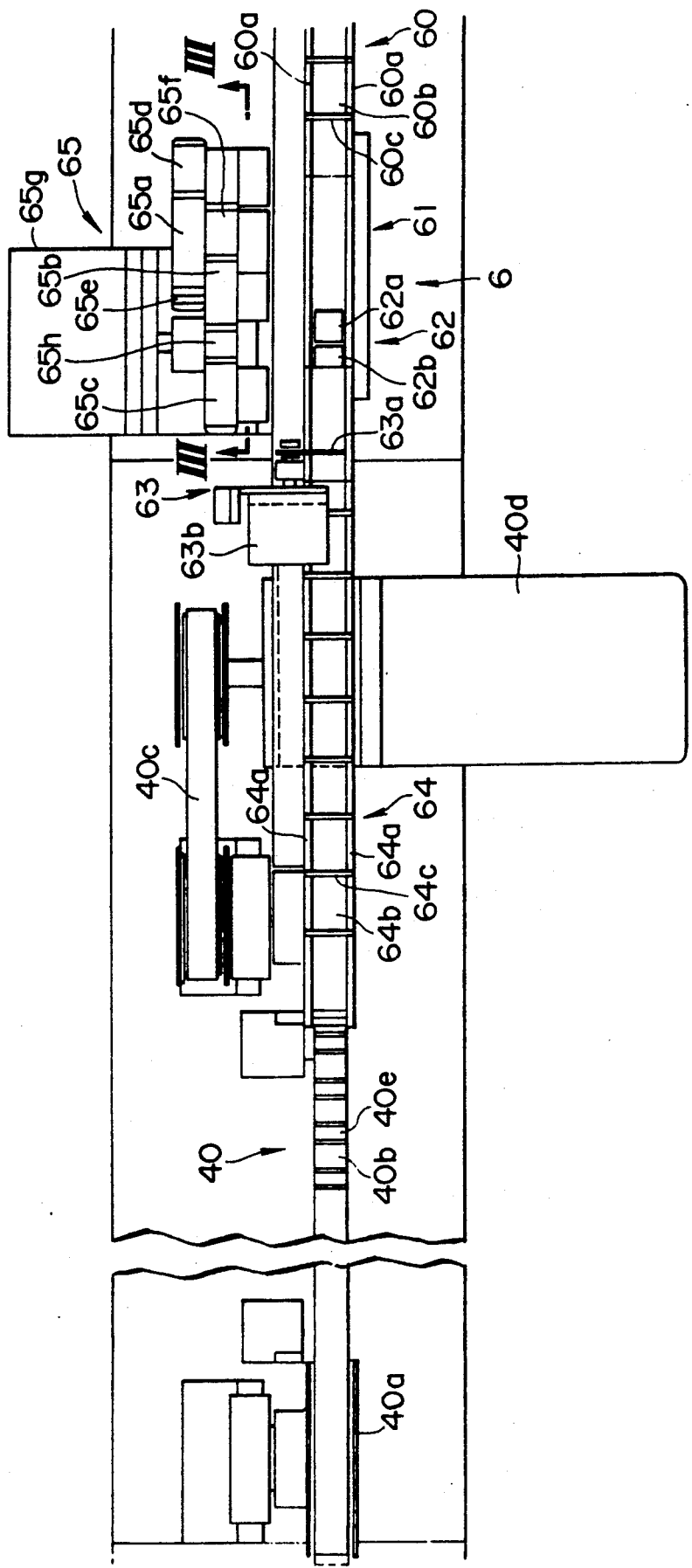
FIG. 2 is a plan view of the apparatus shown in FIG. 1.

As shown in FIGS. 1 and 2, the above mentioned pellet handling apparatus 6 is made up of a pellet introducing unit 60, an intermittent pellet supply unit 61, a pellet rotating unit 62, a pellet sorting unit 63, a selected pellet transfer unit 64, as well as a rotary driving unit 65 which serves to revolve each of the rollers between intermittent pellet supply unit 61 and pellet rotating unit 62. The above mentioned pellet introducing unit 60 has a pellet introducing rail 60b with plates 60a on each side. This pellet introducing rail 60b is seen in FIG. 1 to slope downwards from right to left. Screen interference plates 60c are located between the guide plates 60a at fixed regular intervals to prevent the pellets from slanting.

As seen in FIG. 1, the above mentioned intermittent pellet supply unit 61 includes a cross shaped introduction roller 61a which rotates in a clockwise direction provided at the outlet point of pellet introducing rail 60b. The pellets are received one at a time in the concave portions 61b of this introduction roller 61a, then transported individually and intermittently to the lower portion of the introduction roller 61a. When the pellets are in the first part of the intermittent pellet supply unit 61, they are stopped and both of their ends are visualized by means of the above mentioned paired end surface imaging units 5.

Figure 3:
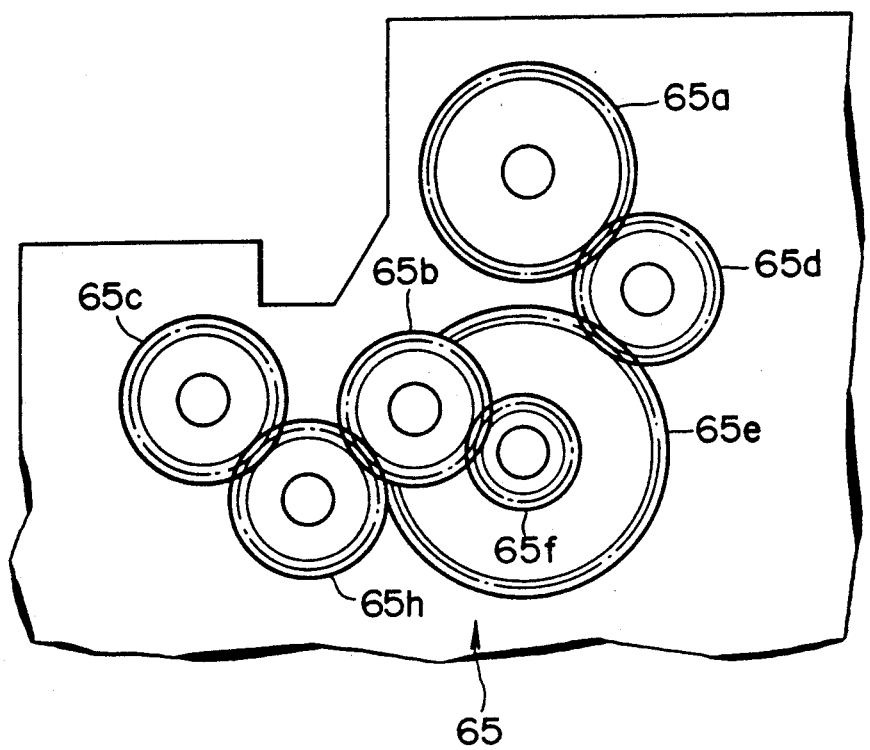
FIG. 3 is a is a sectional view through the horizontal plane containing the line labeled III—III in FIG. 2, viewed in the direction of the arrows.

As seen in FIG. 1, the above mentioned intermittent pellet rotating unit 62 includes a cylindrical roller 62a and a transfer roller 62b placed succesively, both of which rotate in a counter-clockwise direction. This transfer roller 62b has a transfer slot 62c of which one edge 62d has a radius of curvature comparatively larger than that of the opposite edge 62e, so that pellets are easily transfered from the side with the edge 62d with the greater radius of curvature. The above mentioned circumferential imaging unit 7 is positioned above the pellets when they are located between cylindrical roller 62a and transfer roller 62b. As shown in FIG. 3, the introduction roller 61a of intermittent pellet supply unit 61, as well as cylindrical roller 62a and transfer roller 62b are connected via their respective axles to gears 65a, 65b, and 65c of rotary driving unit 65. The introduction roller gear 65a is connected with cylindrical roller gear 65b via intermediate gear 65d, speed reduction gear 65e and small gear 65f which is coaxially provided on speed reduction gear 65e. Cylindrical roller gear 65b and transfer roller gear 65c are engaged respectively with drive gear 65h which is provided on the rotating axle of driving motor 65g.

On the above mentioned pellet sorting unit 63 is provided shutter 63a located alongside transfer roller 62b which can freely open and close in the up-down direction. This shutter 63a is driven by shutter drive unit 63b. When the shutter 63a is closed, the transfer of pellets moving toward selected pellet transfer unit 64 is prevented and the pellet is discarded by the discard pellet discard unit 66 provided below transfer roller 62b.

As shown in FIG. 1, the above mentioned selected pellet transfer unit 64 is, just as with pellet introducing unit 60, provided with a pellet introducing rail 64b with guide plates 64a on each side which slopes downward from right to left. Screen interference plates 64c are located between the guide plates 64a at fixed regular intervals to prevent the pellets from moving out of alignment. At the outlet point of pellet introducing rail 64b, the pellet conveyer 40 of pellet stacker 4 is provided. This pellet conveyer 40 is comprised of a conveyer belt 40b suspended between and rotating about paired conveyer pulleys 40a. Motor 40d is connected with one of the above mentioned conveyer pulleys 40a via belt 40c. The outer surface of conveyer belt 40b is provided with protuberances 40e at fixed intervals, and the pellets are held between these protubernances 40a while conveyed over the surface of the belt.

Fof the external inspection apparatus included with the pellet handling apparatus as described above, after the orientation of the pellets is switched by direction switching assembly 1, the pellets are dried by drying unit 2, and then while rotating on pellet introducing rail 60b of pellet introducing unit 60, transported to intermittent pellet supply unit 61. Then, while in the first portion of intermittent pellet supply unit 61, both ends of the pellets are imaged by paired end surface imaging units 5. Afterwards, as shown in FIG. 1, introduction roller 61a is rotated by rotary driving unit 65 in a clockwise direction, by which means the pellets are introduced into the concave portions 61b of introduction roller 61a and thereby carried into a lower position from which it is delivered onto cylindrical roller 62a (refer to FIGS. 6 and 7). At this time, as shown in FIG. 6, the pellet p0 which has been rotating placed between cylindrical roller 62a and transfer roller 62b is admitted into transfer slot 62c.

Figure 8:
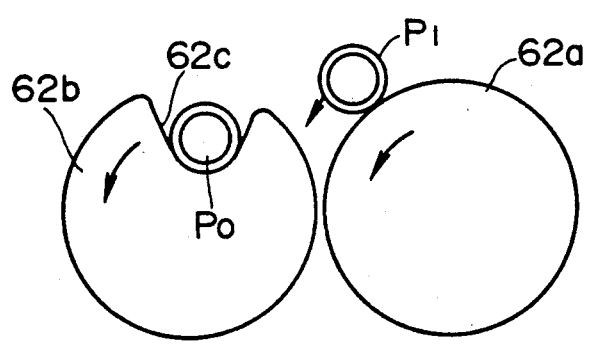
Figure 9:
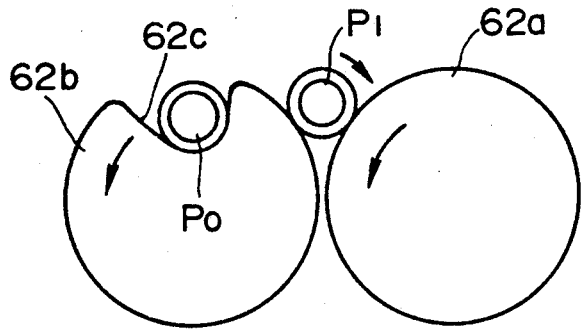

Then, as shown in FIG. 8, the following pellet p1 is carried from the top of cylindrical roller 62a to the side of transfer roller 62b, where, as shown in FIG. 9, the pellet p1 is now positioned between cylindrical roller 62a and transfer roller 62b rotating in a clockwise direction. Thereafter, as shown in FIGS. 9 through 13, at a fixed rate of revolution, a panoramic image of the peripheral surface of the pellet is obtained by circumferential imaging unit 7.

Figure 6:
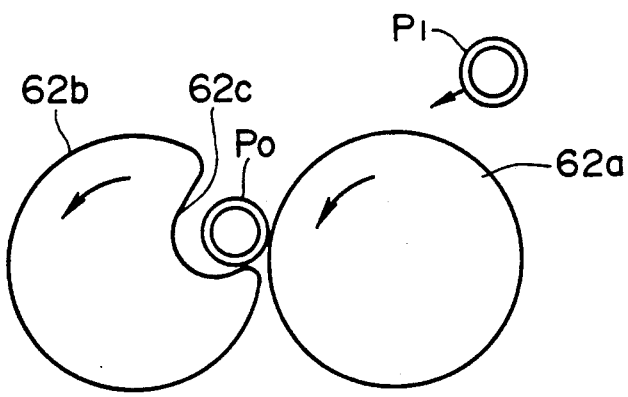
FIGS. 6 through 13 are explanatory drawings for demonstration of the action of the transfer roller 62b employed in the apparatus pictured in FIGS. 1-5.
Figure 7:
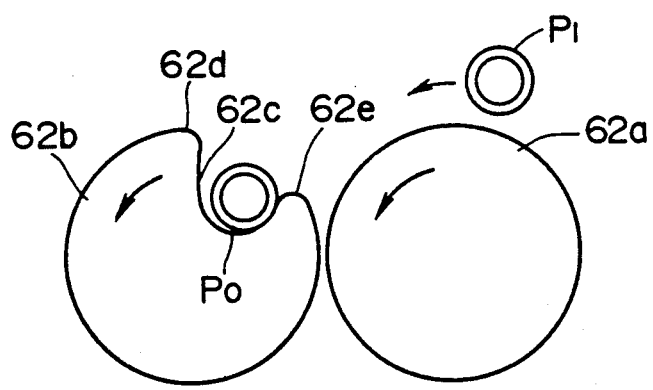
Figure 10:
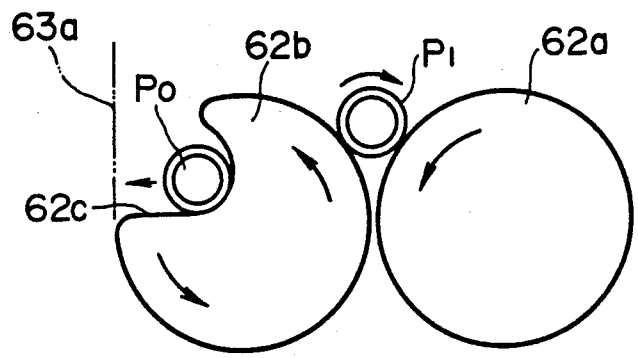
Figure 11:
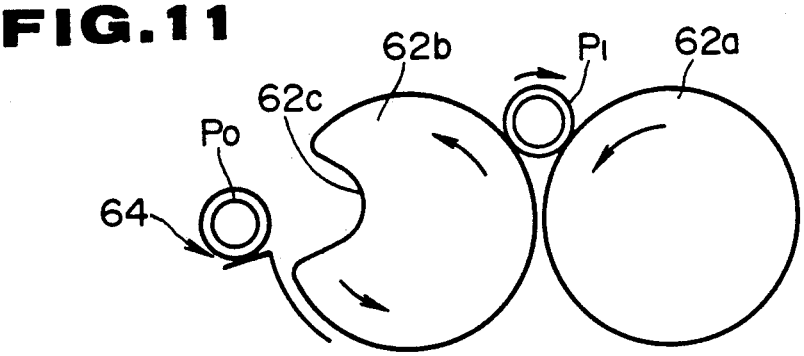
Figure 12:
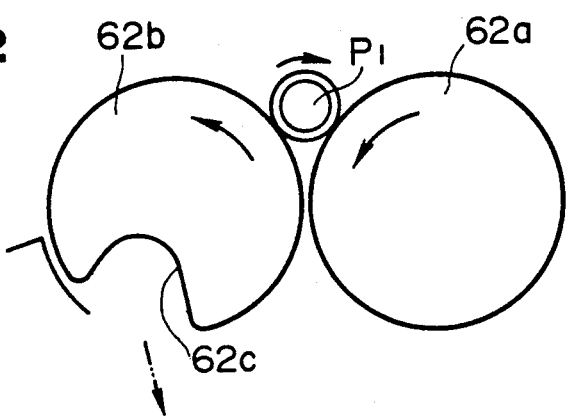
Figure 13:
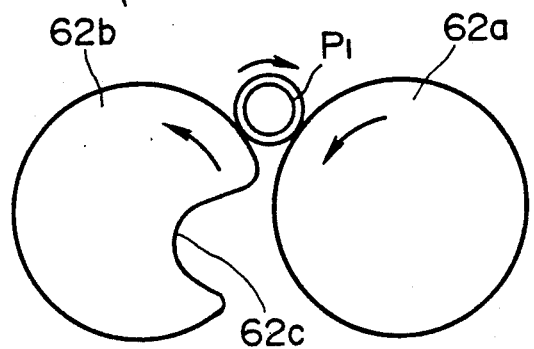

The pellet p0 which has been received by the transfer slot 62c of transfer roller 62b as shown in FIG. 6, is brought to pellet sorting unit 63, as shown in FIGS. 7 through 10, by the rotation of transfer roller 62b. At this time, based on the images obtained by the paired end surface imaging units 5 and the circumferential imaging unit 7, pellets p0 judged to be selected (high quality) are rolled from transfer slot 62c onto pellet introducing rail 64b and then to pellet stacker 4 (see FIG. 11). For pellets judged to be non-selected (inferior quality), shutter 63a indicated by the broken line in FIG. 10 is brought into a closed position through the action of shutter drive unit 63b. Because in this circumstance, shutter 63a is closed, the pellet continues to revolve with transfer roller 62b in transfer slot 62c, and is then, as shown in FIG. 12, discarded into discard pellet discard unit 66.

In this way, while the pellet P which is revolving at a fixed and regular rate placed between cylindrical roller 62a and transfer roller 62b, both of which are revolving in the same direction, a panoramic image of the circumferential surface of the pellet can be obtained. By this means, it is possible to smoothly obtain images of the respective pellet's surfaces reliably, at a high rate. Furthermore, if air is pulled between cylindrical roller 62a and transfer roller 62b by means of a vacuum drawn below, adherent dust, chips and the like can be removed. In the case of comparatively large chips (1 mm and larger), because cylindrical roller 62a and transfer roller 62b are moving in the same direction, the chips do not become trapped between the two rollers, but rather are received in the transfer slot 62c of transfer roller 62b and with each revolution of the roller, are dropped below into the discard pellet discard unit 66.

Figure 24:
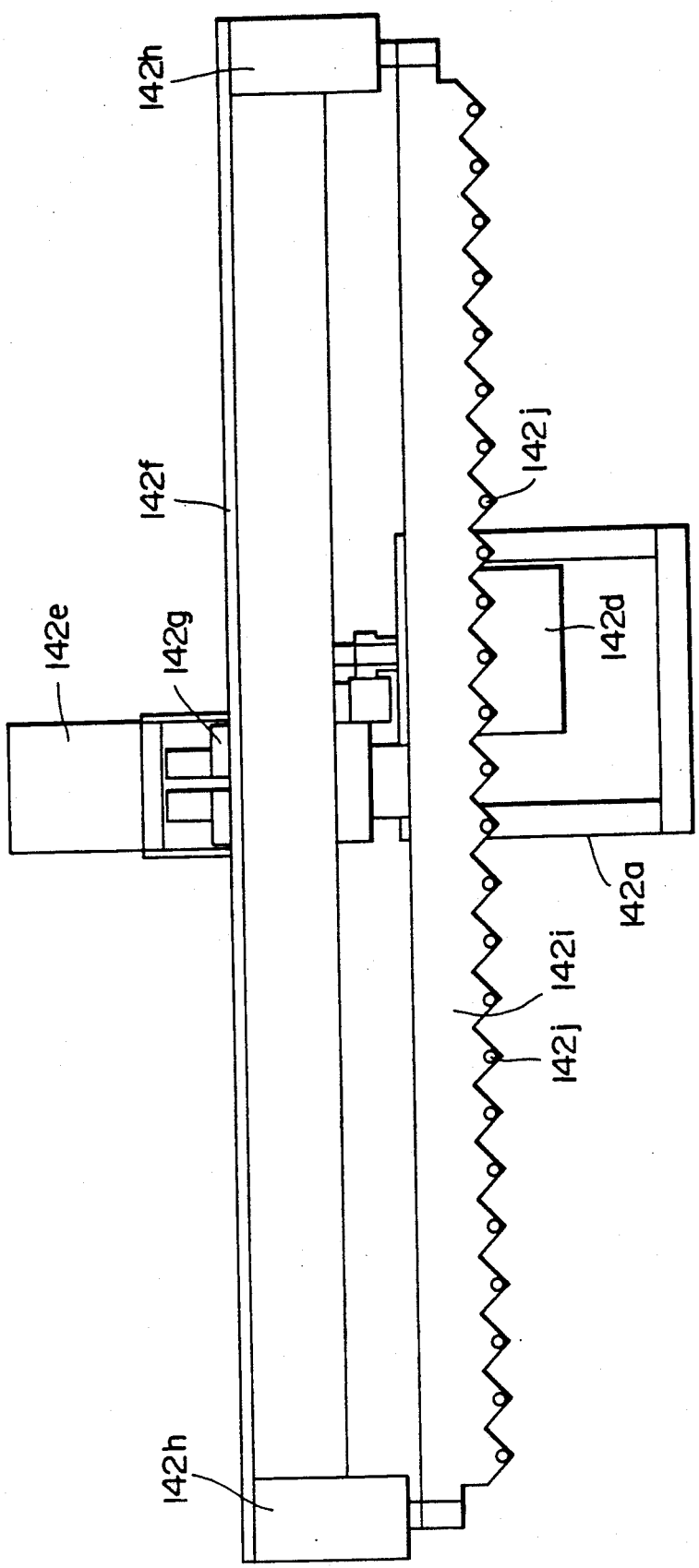
FIG. 24 is a front elevation of the pellet gathering assembly employed in the second preferred embodiment of the present invention shown in FIG. 23.
Figure 25:
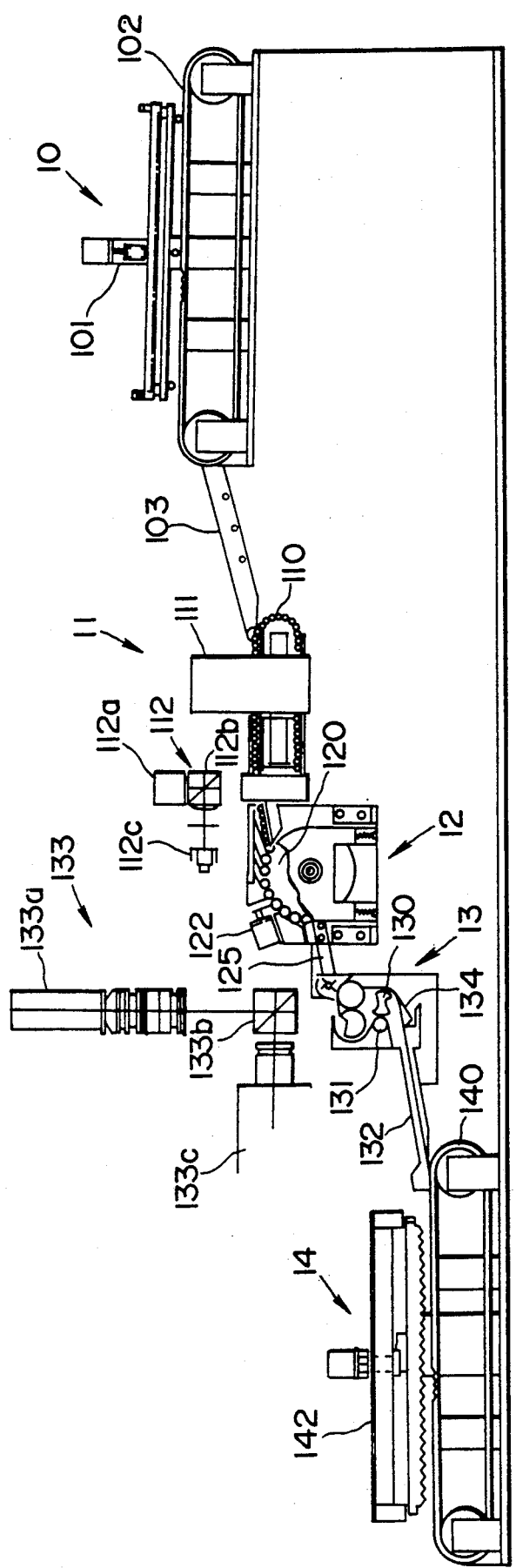
FIG. 25 is a front elevation of the external inspection apparatus employed in the second preferred embodiment of the present invention.

In the following section, a second preferred embodiment of the pellet external surface inspection apparatus will be described with reference to FIGS. 14 through 26. As shown in FIGS. 25 and 26, the pellet external surface inspection apparatus of this embodiment comprises a direction switching assembly 10 by which means the direction in which the pellets are conveyed is switched from the axial direction of the pellets to a direction perpendicular thereto. Further, the pellet external surface inspection apparatus of the present embodiment comprises a drying - rough sorting apparatus 11 which dries and sorts the pellets after the above described switch in direction, and end surface inspection unit 12 by which means the ends of the sorted pellets may be inspected, a circumferential inspection apparatus 13 by which means the circumferential surface of the pellets may be inspected, and a pellet gathering assembly 14 to collect the pellets selected as suitable by the above mentioned circumferential inspection apparatus 13.

The above mentioned direction switching assembly 10 includes buffer trays 100 upon which the pellets are placed arranged along their axes in multiple rows and columns (for example 25 columns), as well as a circumferential surface pickup unit 101 by which means the pellets on the buffer tray, one from each column, are grasped on their respective circumferential surfaces and conveyed. The above mentioned buffer trays 100 are formed as a corrugated plate and the multiple pellets of each column are arranged end to end within respective valley portions of the buffer trays 100, the multiple parallel valley portions thus containing the multiple columns. The pellets on the above mentioned buffer trays 100 are placed aligned along their longitudinal axes after exiting a wet grinding apparatus in which the surfaces of the pellets are ground after completion of sintering. Because the output of the above mentioned wet grinding apparatus varies depending on such factors as input timing of the pellets, grinding thickness and other control variable of the wet grinding apparatus, in order to accomodate the output of this apparatus, the above mentioned buffer trays 100 are multiply provided. The above mentioned buffer trays 100 are afterwards placed in a pellet pickup position and a conveyer 102 is provided so as to convey the buffer tray 100 in a direction perpendicular to its longitudinal axis when placed in the pickup position. The above mentioned circumferential surface pickup unit 101 is provided so as to be above the conveyer 102 and buffer trays 100 when they are placed in the pickup position. The above mentioned conveyer 102 is provided so as to convey the pellets in a direction perpendicular to the longitudinal axis of the buffer trays 100, moving them sideways at a fixed interval.

Figure 14:
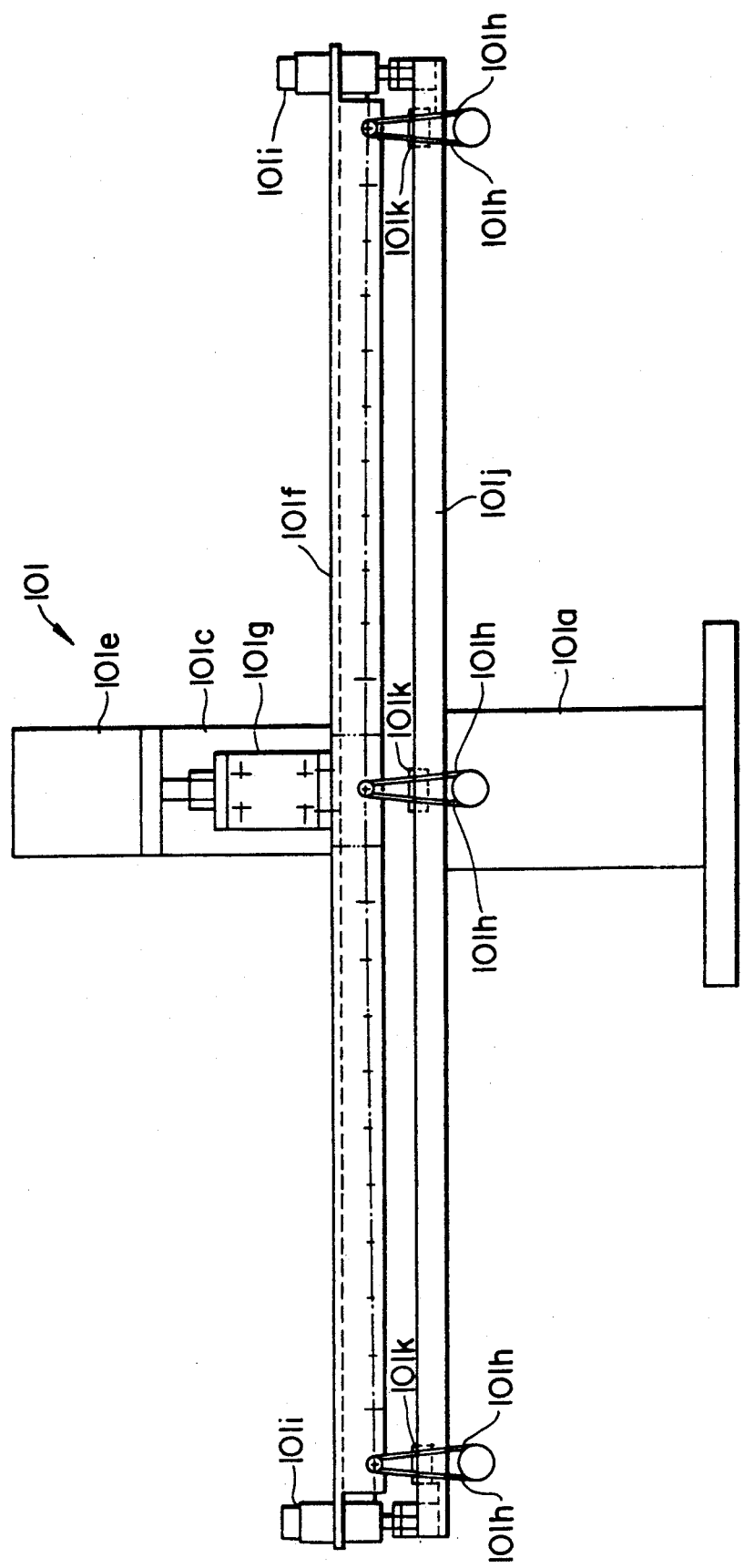
FIG. 14 is a front elevation of the pellet direction switching assembly employed in a second preferred embodiment of the present invention.
Figure 15:
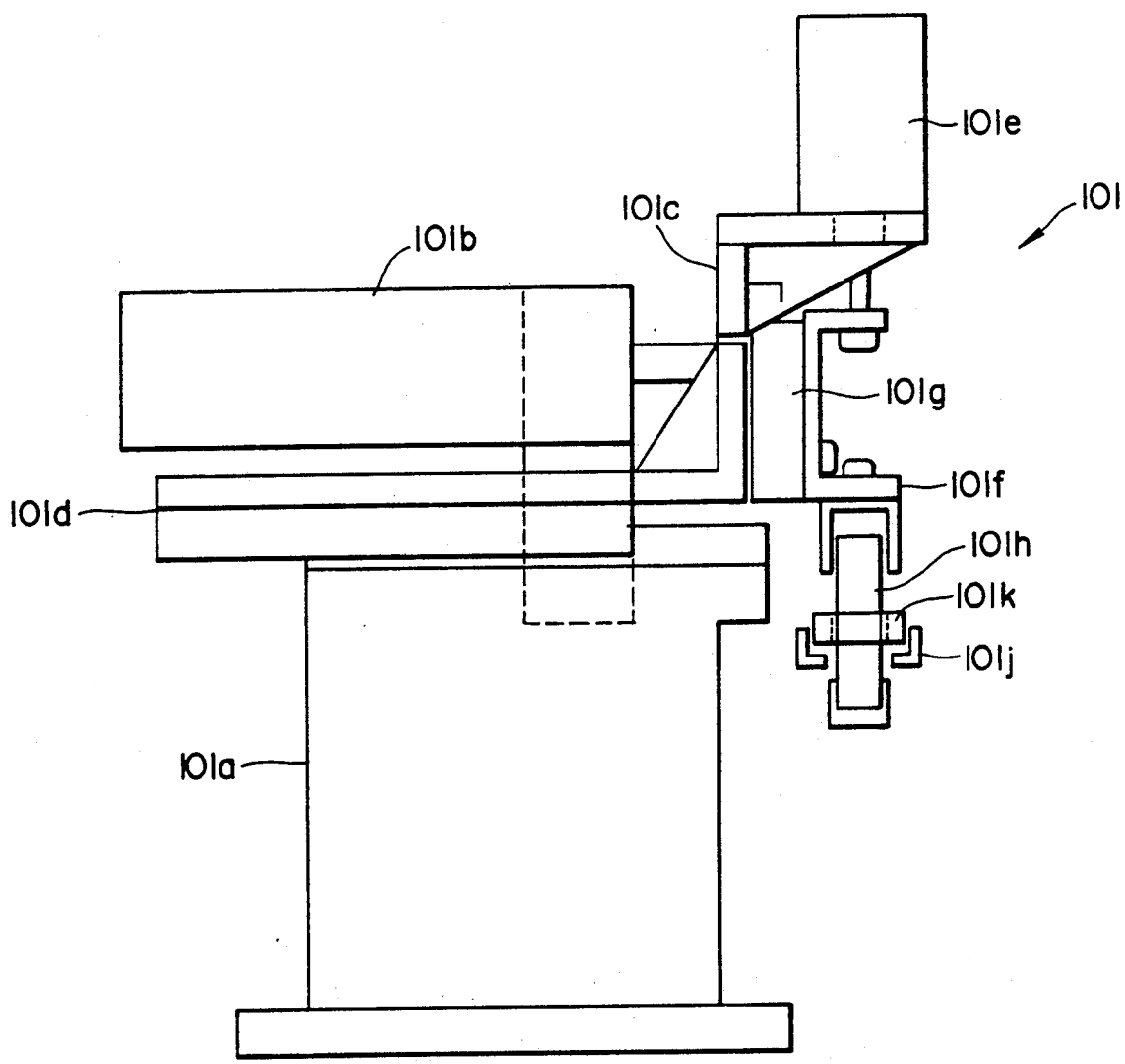
FIG. 15 is a side view of the pellet direction switching assembly shown in FIG. 14.

The above mentioned circumferential surface pickup unit 101 includes, as shown in FIGS. 14 and 15, a horizontal cylinder 101b above base 101a. A movable segment 101c is provided freely moveably on the terminal end of the piston rod of the above mentioned horizontal cylinder 101b, so as to be guidably supported by ball slide 101d provided between horizontal cylinder 101b and base 101a. Further, a vertical cylinder 101e is provided on movable segment 101c. A vertically movable segment 101f is provided freely moveably in the vertical direction on the terminal end of the piston rod of the above mentioned vertical cylinder 101e, so as to be guidably supported by ball slide 101g provided between vertical cylinder 101e and movable segment 101c. The lower end of vertically movable segment 101f diverges into two limbs, and between these two limbs, multiple pairs (for example 25) of pickup grips 101h are provided so as to be freely openable and closable, the two limbs of the lower end of vertically movable segment 101f serving as support points. Also, between the two limbs of the lower end of vertically movable segment 101f are provided a pair of opening-closing cylinders 101i, to the lower ends of the piston rods of which a pair of elongated stopper guides 101j are attached. Grip stoppers 101k are held between the pair of stopper guides 101j. A pair of the above mentioned pickup grips 101h is held in an internal opening of each respective stopper guide 101j in a freely slidable relationship. Between each pair of pickup grips 101h of the circumferential surface pickup unit 101, a pellet from the above mentioned buffer trays 100 is grasped and moved onto the above mentioned conveyer 102.

Figure 16:
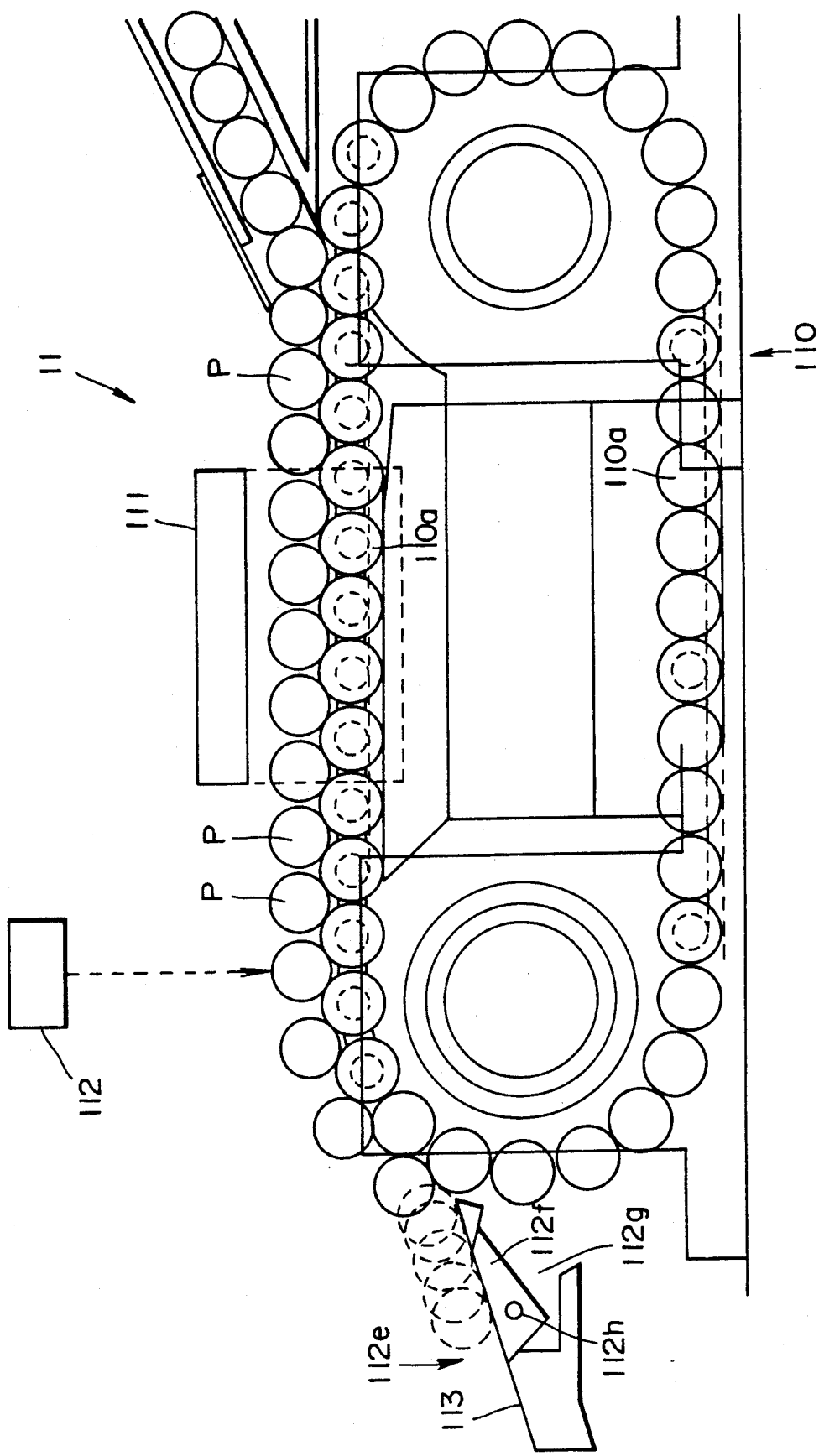
FIG. 16 is a front elevation of the drying - rough sorting apparatus employed in the second preferred embodiment of the present invention.
Figure 17:
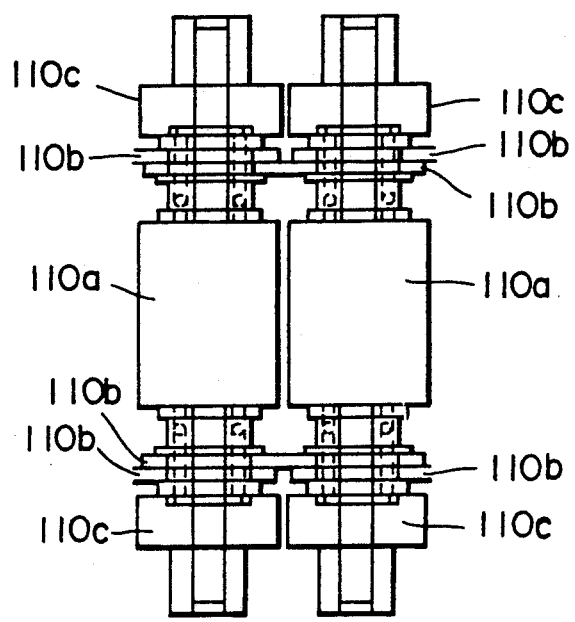
FIG. 17 is a horizontal section of a pair of adjacent rollers from the revolving conveyer unit employed in the second preferred embodiment of the present invention.
Figure 18:
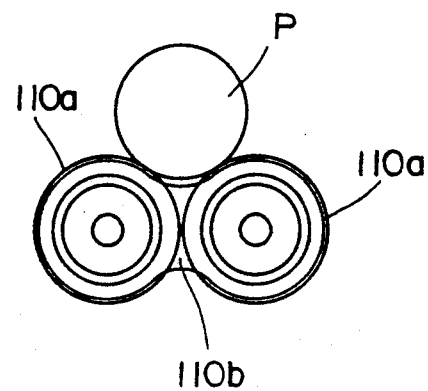
FIG. 18 is an end view of the rollers shown in FIG. 17.

At the conveyer output end of the above mentioned conveyer 102, an inclined rail 103 is provided on which the pellets roll down in a direction perpendicular to the longitudinal axis of the inclined rail 103. On the lower end of the above mentioned inclined rail 103, the previously mentioned drying - rough sorting apparatus 11 is provided. This drying - rough sorting apparatus 11, as shown in FIG. 16, includes a revolving conveyer unit 110 over which the pellets proceed in a direction perpendicular to their longitudinal axes while rotating about their longitudinal axes. On this revolving conveyer unit 110 is provided a drying unit 111. At the last portion of the drying unit 111 is a rough sorting unit 112 which images the revolving pellets from above and on the basis of this image, the pellets are sorted.

The above mentioned revolving conveyer unit 110 is formed from a plurality of revolving rollers 110a. Each revolving rollers 110a is coupled to its two neighboring rollers by coupling chains 110b which are in the form of an endless loops and are provided at both ends of the rollers. Gears 110c are provided on each end of each roller which engage with fixed racks. By virtue of engaging gears 110c and racks as well of the coupling chains 110b linking adjacent revolving rollers 110a, the rollers are caused to rotate in synchrony in the same direction while proceeding forward in a direction perpendicular to their longitudinal axes. On the upper part of the revolving conveyer unit 110, the above mentioned drying unit 111 is provided along with the rough sorting unit 112 which is adjacent to the drying unit 111. As shown in FIG. 25, the rough sorting unit 112 is composed of a two dimensional high speed shutter camera (CCD camera) 112a placed above the revolving conveyer unit 110, a semi-transparent mirror 112b, an illuminating device 112c, and an image processing unit by which means the images from the high speed shutter camera are examined and the pellets are thereby inspected for relatively major flaws. Also included is a defective pellet exclusion unit 112e by which means pellets judged to be defective by the image processing unit are discarded. By means of a mask which is matched with the image obtained by the high speed shutter camera, the above mentioned image processing unit restricts the area of the image which is inspected to only that of the pellet, and through this process, is able to detect relatively major flaws in the pellets. The defective pellet exclusion unit 112e is provided at the output end of the above mentioned revolving conveyer unit 110 along with a supply rail 113 on which a swinging trap 112f is provided. The above mentioned swinging trap 112f revolves about a support point 112h in a downward direction by which means pellets judged to be defective are dropped through an opening portion 112g.

Figure 19:
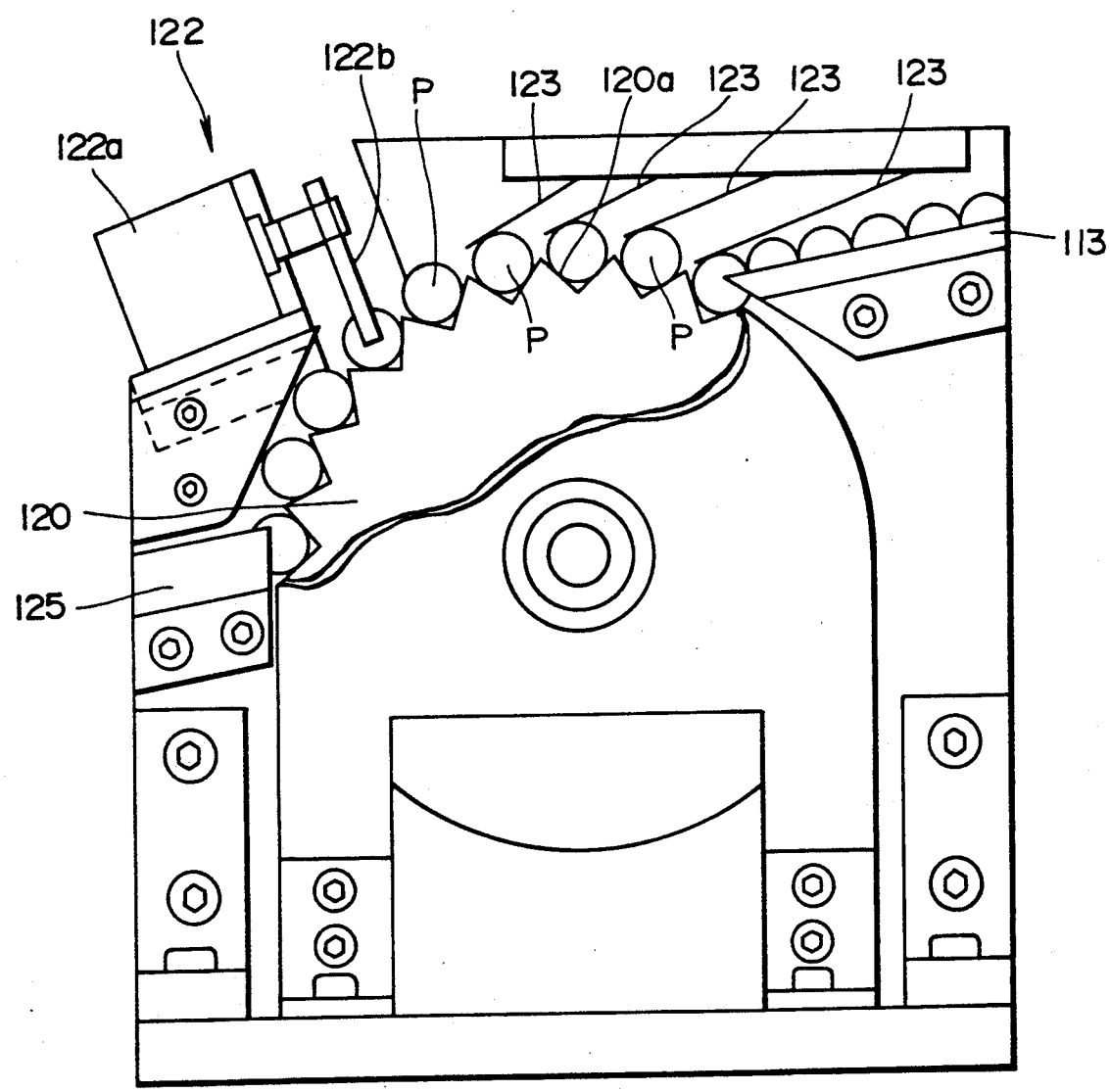
FIG. 19 is a front elevation of the end surface inspection unit employed in the second preferred embodiment of the present invention.
Figure 20:
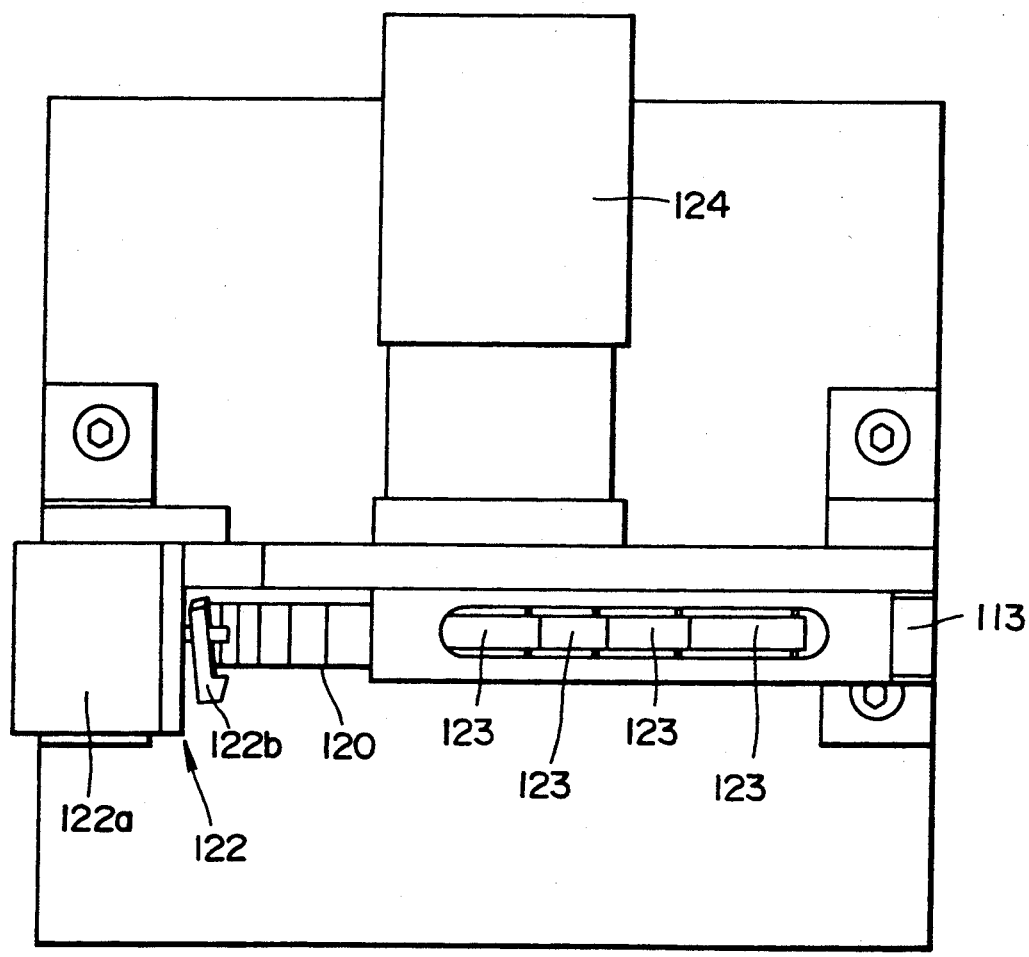
FIG. 20 is plan view of the end surface inspection unit employed in the second preferred embodiment of the present invention shown in FIG. 19.

On the output end of the above mentioned supply rail 113, the previously described end surface inspection unit 12 is provided. As shown in FIGS. 19 and 20, this end surface inspection unit 12 has an intermittently rotating conveyer disk 120 which has a plurality of pellet receiving V-grooves 120a on its outer circumferential surface. While received in the V-grooves 120a, each end of each pellet is independently imaged, and on the basis of these images, the pellets are judged as acceptable or not acceptable by means of an end surface evaluation unit 121 shown in FIG. 26. The end surface inspection unit 12 also includes a defective pellet discard unit 122 by which means pellets judged defective by the above mentioned end surface evaluation unit 121 are discarded. Through the action of a drive motor 124, the above mentioned conveyer disk 120 conveys the pellets at a high speed and is controlled to minimize inertial and thereby reliably and stably stop the pellets at fixed postions. At the upper part of the conveyer disk 120, the pellets are lightly pushed into the grooves by means of swinging pressure plates 123 which are free to pivot in the vertical direction.

The above mentioned end surface evaluation unit 121 includes 2 two dimensional cameras (CCD camera) 121a placed at positions on either side of the rotating conveyer disk 120 to thereby independently image each end of each pellet, a semi-transparent mirror 112b and an illuminating device 122c for each camera 121, and an image processing unit by which means the images from the cameras are examined and the ends of the pellets are thereby inspected for flaws. The rotating of the conveyer disk 120 is momentarily stopped when the pellets ends are imaged. For the imaging process, the each pellet end is uniformly illuminated by the respective illuminating device 122c. The obtained image is processed by the above mentioned image processing unit, the area of the image processed being limited to ends of the pellet. On the basis of the imaging processing, the pellets are judged as suitable or non-suitable. Those pellets judged non-suitable are discarded by above mentioned defective pellet discard unit 122 by which means pellets judged to be defective by the image processing unit are discarded. The defective pellet discard unit 122 includes a rotary solenoid 122a provided above the conveyer disk 120. An discard bar 122b is provided attached on the rotary axle of the rotary solenoid 122a. For those pellets judged to be defective, the rotary solenoid 122a is activated, and by the swinging of the discard bar 122b, the pellet received in the V-groove 120a of the conveyer disk 120 is transfered to the side. A guide rail 125 is provided on the output side of the conveyer disk 120.

Figure 21:
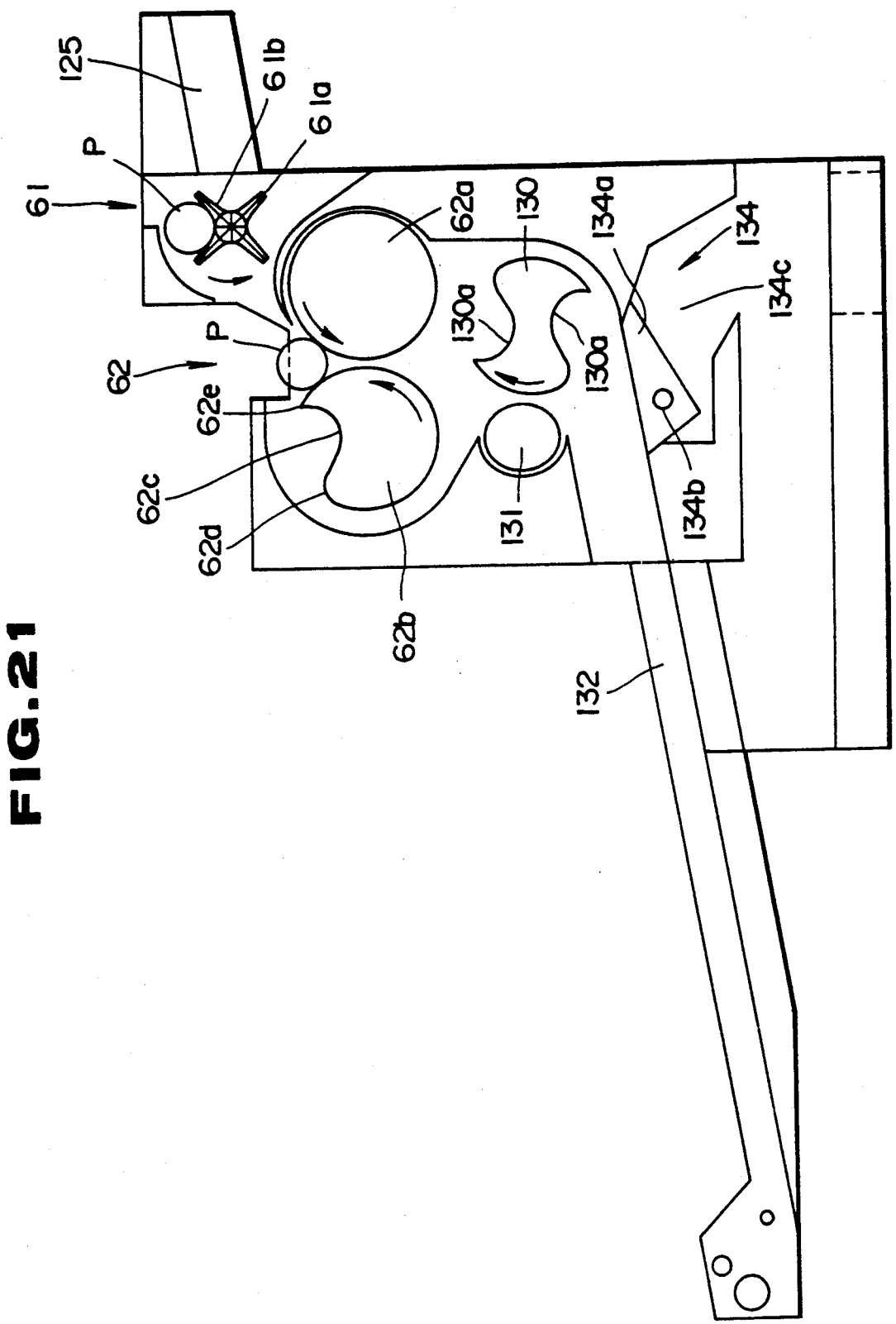
FIG. 21 is a front elevation of the circumferential inspection apparatus employed in the second preferred embodiment of the present invention.
Figure 22:
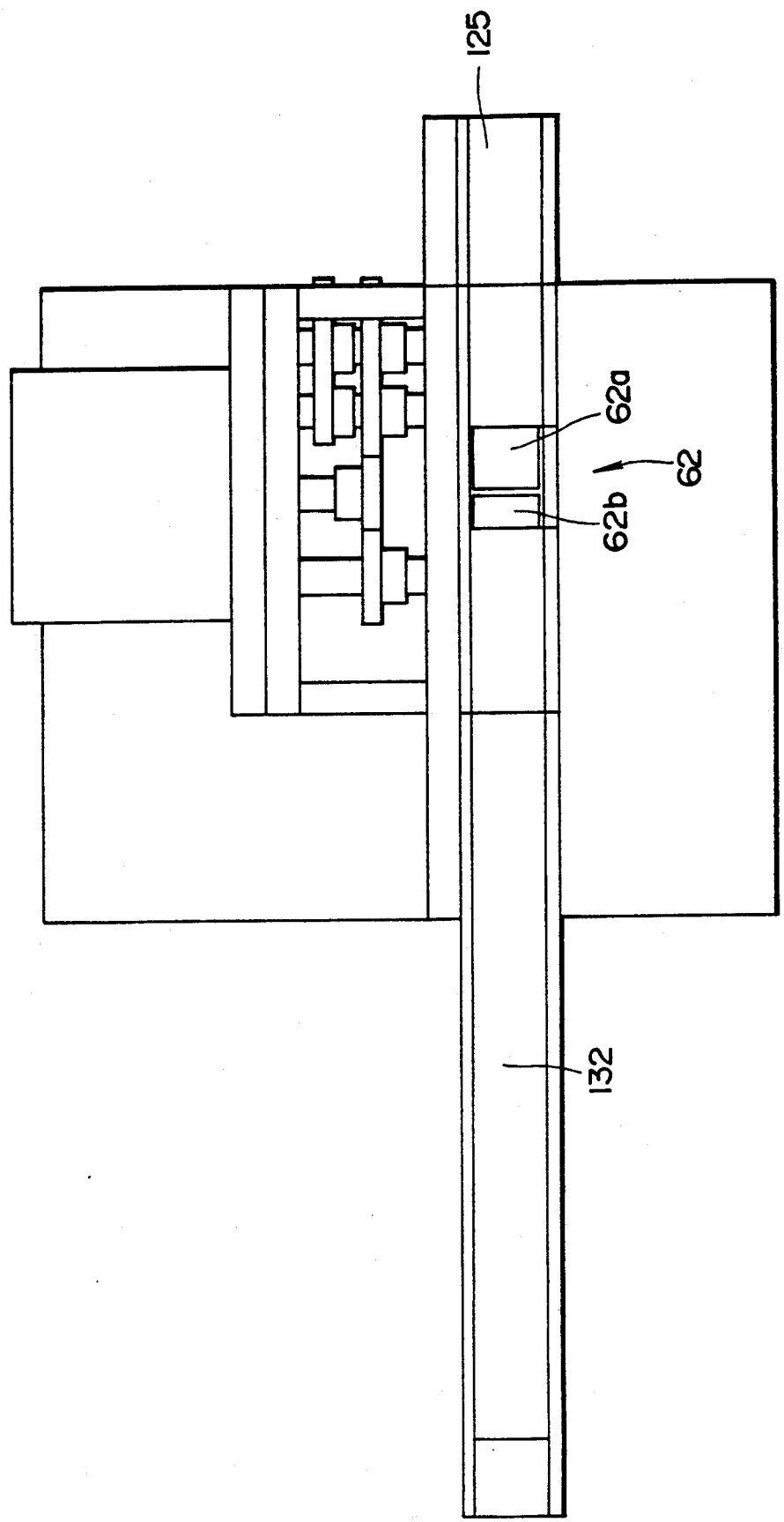
FIG. 22 is plan view of the circumferential inspection apparatus employed in the second preferred embodiment of the present invention shown in FIG. 21.

The above mentioned circumferential inspection apparatus 13 is provided on the output end of the above mentioned guide rail 125. Also provided, similar to the first preferred embodiment, are the intermittent pellet supply unit 61 and pellet rotating unit 62. However in the case of this second preferred embodiment, the introduction roller 61a included on the intermittent pellet supply unit 61, as shown in FIG. 21, rotates in a counter-clockwise direction. Thus the pellet received in the concave portions 61b of introduction roller 61a pass over the introduction roller 61a to be received by the pellet rotating unit 62. Below the pellet rotating unit 62, an S-shaped delivery roller 130 and a guide roller 131 are provided so as be freely rotatable. Pellets are received in the paired concave portions 130a of the delivery roller 130 and from there transfered onto the transfer rail 132. A circumferential inspection unit 133 is provided above the pellet rotating unit 62.

The above mentioned circumferential inspection unit 133 includes a line sensor camera 133a, semi-transparent mirror 133b, as well as an illumination unit 133c. The illumination unit 133c is a collimated light source. The line sensor camera 133a provides a one dimensional image of the circumferential surface of the pellets parallel to their longitudinal axes which is then written in two dimensional video memory, thus forming a panoramic image of the circumferential surfaces of the pellets. Based on this panoramic image, the circumferential surfaces of the pellets are inspected for flaws.

Beneath the delivery roller 130 and guide roller 131, a rejected pellet discard unit 134 is provided. This rejected pellet discard unit 134 includes a rotating rejection trap 134a placed in the path over which the pellets are conveyed. The rejection trap 134a rotates in an up-down direction about a support point 134b to thereby allow rejected pellets to fall into an opening portion 134c.

Figure 23:
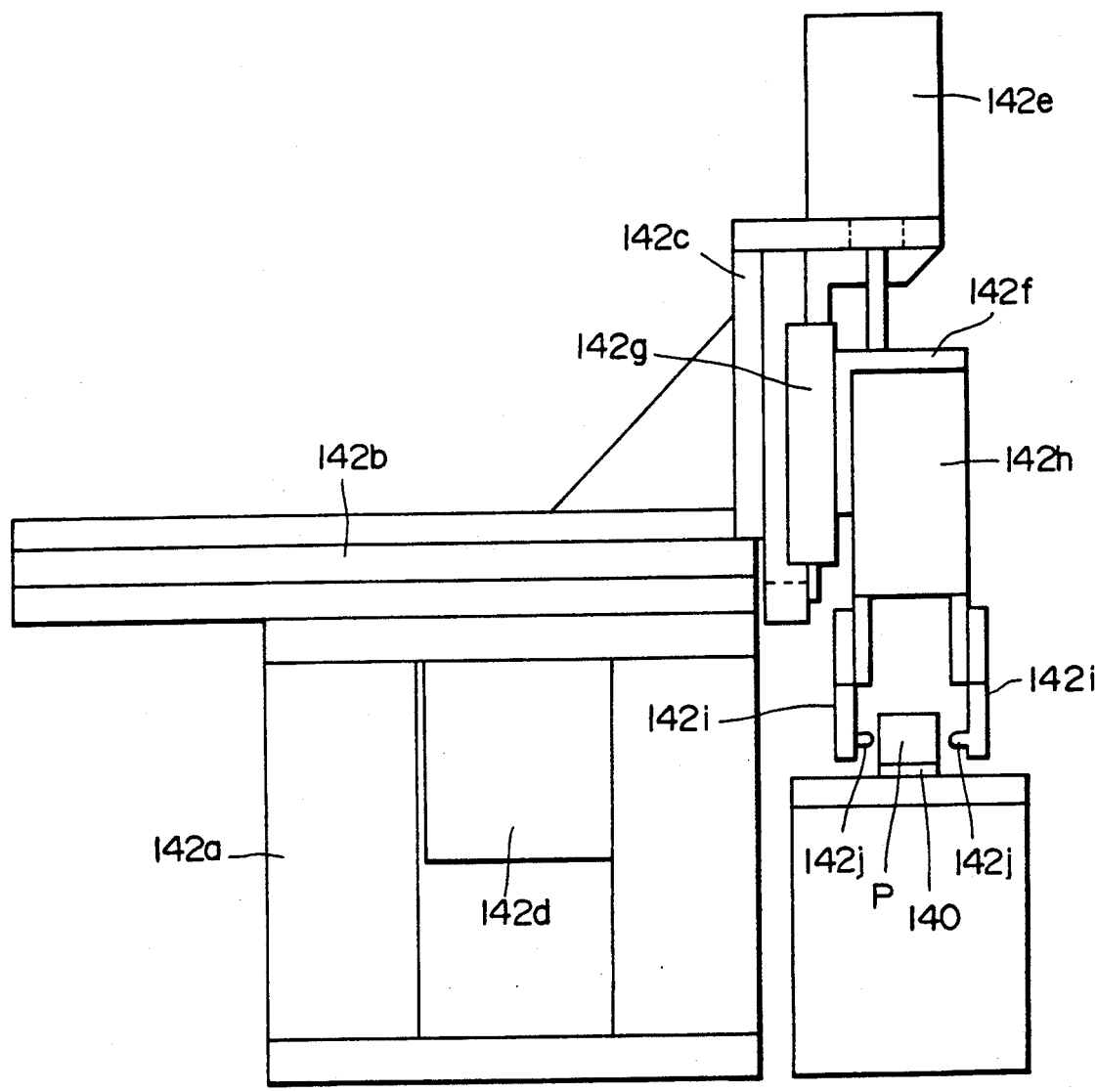
FIG. 23 is a side view of the pellet gathering assembly employed in the second preferred embodiment of the present invention.

A pellet conveyer 140 of the pellet gathering assembly 14 is provided at the output end of the above mentioned ejection rail 132. A fixed tray 141 is provided at a side of the pellet conveyer 140. An end surface pickup unit 142 is provided above the pellet conveyer 140 and fixed tray 141. As shown in FIGS. 23 and 24, this end surface pickup unit 142 includes a movable segment 142c freely movable in the horizontal plane mounted on a base 142a via a ball slide 142b. A motor 142d is connected with the movable segment 142c by which means it is moved in the horizontal plane. A vertical cylinder 142e is provided on movable segment 142c. A vertically movable segment 142f is provided freely moveably in the vertical direction on the terminal end of the piston rod of the above mentioned vertical cylinder 142e, so as to be guidably supported by ball slide 142g provided between vertically movable segment 142f and movable segment 142c. An opening-closing unit 142h is provided attached to vertically movable segment 142f. At the lower end of this opening-closing unit 142h, paired pickup bars 142i are attached, the inner surfaces of which include multiple grips 142j which are spring loaded to push the grips 142j of one side towards those of the opposite side. The above mentioned paired pickup bars 142i are able to open and close through the action of an air cylinder included on the opening-closing unit 142h. An inspection verification unit 143 is connected to the above mentioned fixed tray 141. The inspection verification unit 143 has multiple revolving rollers between which the pellets are transferred from the above mentioned fixed tray 141 through the action of a mass pellet pickup unit. As all of the rollers of the inspection verification unit 143 rotate together, the external inspection of the pellets is carried out. A storage rack 145 is connected with the inspection verification unit 143. The pellets are transferred from the inspection verification unit 143 to the storage rack 145 where they are collected through the action of the mass pellet pickup unit.

With the pellet external surface inspection apparatus of the second preferred embodiment of the present invention as described above, the pellets are aligned along their longitudinal axes after exiting the wet grinding apparatus in which their surfaces are ground after completion of sintering. After exiting the wet grinding apparatus, the pellets are sequentially placed on a plurality of buffer trays 100. Then, the buffer trays 100 are sequentially transferred to a position beside the previously mentioned conveyer 102 so that the longitudinal axes of the pellets placed aligned in multiple parallel columns on the buffer trays 100 are perpendicular to the conveying direction of the conveyer 102.

In this condition, the buffer trays 100 are located beneath the previously described circumferential surface pickup unit 101 of which the piston rod of the vertical cylinder 101e of which at this time lowers, thus causing the vertically movable segment 101f to lower following along the ball slide 101g. The multiple paired pickup grips 101h are now located in a fixed positions, each over one of the pellets within its respective valley portion on the buffer tray 100 and the multiple paired pickup grips 101h are then brought in contact with the pellets. As the multiple paired pickup grips 101h move downward over the pellets of a column as described above, the pickup grips 101h slide freely through the previously mentioned encircling grip stoppers 101k, thus allowing the opposing members of each pair of pickup grips 101h to spread apart as they move into a position of contact with their respective pellet. At this point, the piston rods of the opening-closing cylinders 101i move downward, thus causing the grip stoppers 101k to move downward, thereby causing each grip stopper 101k to press downward on its respective pair of pickup grips 101h. By this action, each pair of pickup grips 101h receives a closing forces causing it to grip its respective pellet at its terminal ends.

Continuing in this condition, through the action of the vertical cylinder 101e, the vertically movable segment 101f moves upward causing all of the pickup grips 101h to move upward together. The pellets held by the terminal ends of the pickup grips 101h, each pickup grip 101h holding one pellet from a respective column, thus are caused to move up from the buffer tray 100. Afterwards, through the action of the horizontal cylinder 101b, the movable segment 101c moves in the horizontal plane following along the ball slide 101g, thereby moving the pellets to a position over the conveyer 102. The vertically movable segment 101f then lowers through the action of the vertical cylinder 101e and the pellets held by the pickup grips 101h are placed on the surface of the conveyer 102. The the piston rod of the opening-closing cylinders 101i raises and the grip stoppers 101k held by stopper guides 101j likewise raise. Through this action, the pickup grips 101h become freely openable and closeable. Then, as the vertically movable segment 101f is caused to raise through the action of vertical cylinder 101e, the pellets remain in position placed on the conveyer 102 and the pickup grips 101h again raise.

In this way, the pellets are placed on conveyer 102 at fixed intervals, and then delivered via inclined rail 103 to the revolving conveyer unit 110 of the drying - rough sorting apparatus 11. After the pellets are placed on conveyer 102, the pickup grips 101h are caused to return to the fixed position above the buffer tray 100 through the action of horizontal cylinder 101b, while at the same time, the pellets are pushed along their respective valley portions of the buffer tray 100 so that the leading pellet in each column arrives at its waiting pair of pickup grips 101h. The above described cycle is in that way carried out continuously.

The pellets having been delivered to the revolving conveyer unit 110, now are moving over its surface in a direction perpendicular to their longitudinal axes while rotating about their longitudinal axes, between a pair of adjacent revolving rollers 110a which are rotating in the same direction. Then, as the pellets pass through the drying unit 111, drops of water adherent to their surfaces from the earlier grinding process are spread out by the revolving rollers 110a and the moisture is then evaporated by heated air. The pellets then pass out of the drying unit 111 one at a time, continuously rotating while at the same time, moving forward in the horizontal plane. As they move into position under the high speed shutter camera, multiple images are obtained at predetermined positions as the pellet rotates. By means of a mask which is matched with the image obtained by the high speed shutter camera, the above mentioned image processing unit restricts the area of the image which is inspected to only that of the pellet, and through this process, is able to detect relatively major flaws in the pellets.

For those pellets found to be defective by the above described inspection process, the swinging trap 112f on the defective pellet exclusion unit 112e provided on supply rail 113 at the output end of the above mentioned revolving conveyer unit 110 swings downward revolving about support point 112h causing the defective pellet to drop through opening portion 112g. For those pellets in which no significant flaws are detected, the swinging trap 112f remains in the closed position and the pellets therefore proceed onto the supply rail 113 and from their are delivered to the conveyer disk 120. By the above described mechanism, defective pellets may be smoothly discarded without interrupting the inspection process or other preceding processes.

As the pellets are delivered to conveyer disk 120 by supply rail 113, they are received in the V-grooves 120a on the conveyer disk 120. Through the action of drive motor 124, conveyer disk 120 revolves and the pellets therefore travel in a circular path. Because the pellets are pressed into the V-grooves 120a by pressure plates 123, they are conveyed by the conveyer disk 120 in a stable condition. As a pellets reaches a prescribed position, the above mentioned end surface evaluation unit 121 including 2 two dimensional cameras (CCD camera) 121a placed at positions on either side of the rotating conveyer disk 120 independently images each end of the pellet. The rotating of the conveyer disk 120 is momentarily stopped when the pellets ends are imaged. For the imaging process, the each pellet end is uniformly illuminated by the respective illuminating device 122c. The obtained image is processed by the above mentioned image processing unit, the area of the image processed being limited to ends of the pellet. On the basis of the imaging processing, the pellets are judged as suitable or non-suitable. Those pellets judged non-suitable are discarded by above mentioned defective pellet discard unit 122 by which means pellets judged to be defective by the image processing unit are discarded. For those pellets judged to be defective, the rotary solenoid 122a is activated, and by the swinging of the discard bar 122b, the pellet received in the V-groove 120a of the conveyer disk 120 is discarded to the side. Those pellets judged to be suitable travel without interference onto the guide rail 125 provided on the output side of the conveyer disk 120, and from there, travel to the circumferential inspection unit 13.

Afterwards, as shown in FIG. 21, the introduction roller 61a included on intermittent pellet supply unit 61, rotating in a counter-clockwise direction, receives the pellets in its concave portions 61b, and the pellets then travel in an upward direction within the concave portions 61b and are supplied onto the top of cylindrical roller 62a. The pellets then travels on cylindrical roller 62a towards transfer roller 62b and thus becomes located in the space between cylindrical roller 62a and transfer roller 62b rotating in a clockwise direction together with the cylindrical roller 62a and transfer roller 62b. Stably rotating in this position, the pellet is illuminated from above by the collimated light source, illumination unit 133c. The line sensor camera 133a provides a one dimensional image of the circumferential surface of the pellet parallel to its longitudinal axis which is then written in two dimensional video memory, thus forming a panoramic image of the circumferential surfaces of the pellets. Based on this panoramic image, the circumferential surfaces of the pellets are inspected for flaws and judged to be suitable or nonsuitable.

After the above described circumferential surface inspection is finished, the pellet is received in the ejection slot 62c of transfer roller 62b and carried in a downward direction and thus placed in a position between delivery roller 130 and guide roller 131. As shown in FIG. 21, delivery roller 130 is rotating in a clockwise direction. Received in one of the concave portions 130a of delivery roller 130, the pellet is carried to a position below delivery roller 130. At this time, for those pellets judged to be defective by the above described circumferential surface inspection, rejection trap 134a swings downward pivoting about support point 134b and the rejected pellet thus falls through opening portion 134c. For those pellets judged to be suitable, the rejection trap 134a of rejected pellet transfer unit 134 remains in its upper position and the pellet thus travels unimpeded to ejection rail 132 and from there to pellet conveyer 140 where they are placed at fixed intervals on the surface of the moving pellet conveyer 140.

The pellets thus placed at fixed intervals onto the surface of pellet conveyer 140 move forward in steps due to the intermittent motion of pellet conveyer 140. When the pellets reach a predetermined position and stop beneath the waiting end surface pickup unit 142, following ball slide 142g, vertically movable segment 142f through the action of vertical cylinder 142e. Simultaneously, the multiple pairs of pickup bars 142i open. Through the above described action, the lower ends of each pair of pickup bars 142i is positioned at either end of a respective pellet. Opening-closing unit 142h is then activated causing the respective members of each pair of pickup bars 142i to approach each other. Through this actions each pellet is grasped at either end by a respective pair of pickup bars 142i, the pellets being held by the grips 142j at the inner surface of each pickup bar 142i. Due to the fact that the grips 142j are spring loaded as previously described, each pellet is thus elastically held in place by the opposing grips of each pair of pickup bars 142i.

At this point, through the action of vertical cylinder 142e, vertically movable segment 142f raises following ball slide 142g. Motor 142d then activates and movable segment 142c is thus caused to move in the horizontal plane following ball slide 142b, then stopping at a fixed position over fixed tray 141. Vertically movable segment 142f is then caused to lower through the action of vertical cylinder 142e. At this point, through the action of opening-closing unit 142h, each pair of pickup bars 142i opens and the pellets are thus released from the spring loaded grips 142j onto fixed tray 141. Then, through the action of vertical cylinder 142e and motor 142d, movable segment 142c returns to a position above pellet conveyer 140 and repeats the cycle to pick up another group of pellets.

As the pellets are placed in respective valley portions of the fixed tray 141, pellet push levers move each column of pellets forward within its respective valley portion of the fixed tray 141, thus opening the position for placing of the pellets by end surface pickup unit 142 as described above. In this way, the pellets are aligned in multiple parallel columns on the surface of fixed tray 141, each column within a respective valley portion of the fixed tray 141. As fixed tray 141 becomes full, the pellets are then transferred in mass from the fixed tray 141 through the action of a mass pellet pickup unit onto the inspection verification unit 143 which has multiple revolving rollers between which the pellets are placed. At this time, final inspection and verification of the condition of the pellets may be carried out by inspection personnel.

After completion of the final inspection, the pellets are transferred from the inspection verification unit 143 onto storage trays 144 which are then automatically received by storage rack 145.

What is claimed is:

1. A pellet handling equipment for conveying pellets comprising:
   (a) a first roller means supported generally horizontal and rotatable about an axis thereof for a rotation in a predetermined direction;
   (b) a second roller means disposed parallel and adjacent to the first roller means, supported rotatable about an axis thereof for a rotation in a same direction with the first roller means, the second roller means being provided with a slot formed in a circumferential surface thereof and extending in the axial direction, the slot being capable of receiving each one of the pellets;
   (c) a pellet supplying means for intermittently supplying the pellets to the first and second roller means, whereby each of the intermittently supplied pellets is supported by the first and second roller means therebetween so that the axis of the pellet is parallel to the axes of the first and second roller means, rotated about an axis thereof as the first and second roller means rotate, trapped in the slot of the second roller means, and conveyed to the side opposite to the first roller means.

2. A pellet handling equipment according to claim 1 which further comprises:
   (a) a first pellet transfer unit provided adjacent to the second roller means on a side generally opposite to the first roller means for receiving the pellets;
   (b) a second pellet discard unit provided adjacent to the second roller means underneath thereof for receiving the pellets; and
   (c) a sorting means provided adjacent to the second roller means for receiving the pellets from the second roller means and selectively sending the pellets to one of the first pellet transfer unit and the second pellet discard unit.

3. A pellet handling equipment according to claim 2 wherein the sorting means is disposed between the second roller means and the first pellet transfer unit, and comprises a shutter for selectively allowing and prohibiting the entrance of the pellets into the first transfer unit, whereby the pellets conveyed to the other side of the first roller means are selectively sent into one of the first transfer unit and second discard unit.

4. A pellet handling equipment according to claim 3 wherein the slot formed in the second roller means have at least two different curvatures.

5. A pellet handling equipment according to claim 4 wherein the slot has a first concave wall facing to the direction of rotation of the second roller means and a second concave wall facing the first wall opposedly, curvature of the first concave wall being greater than that of the second concave wall.

6. A pellet handling equipment according to claim 1 which further comprises a vacuum means for evacuating a space between the first and the second roller means, whereby cleaning the debris which may appear therebetween.

7. A pellet handling equipment according to claim 1 which further comprises at least one flaw detecting means capable of detecting flaws on each of the pellets.

8. A pellet handling equipment according to claim 7 wherein the flaw detecting means comprises at least an imaging means for taking images of the pellets as the pellets are being supported and rotated by the first and the second roller means, whereby a whole surface of the each pellet is imaged.

9. A pellet handling equipment according to claim 8 wherein the flaw detecting means further comprises means for judging existence of flaws on each of the pellets.

10. A pellet handling equipment for conveying pellets, and detecting and ejecting flawed pellets, the pellet handling equipment comprising:
  (a) a first roller means supported generally horizontal and rotatable about an axis thereof for a rotation in a predetermined direction;
  (b) a second roller means disposed parallel and adjacent to the first roller means, supported rotatable about an axis thereof for a rotation in a same direction with the first roller means, the second roller means being provided with a slot formed in a circumferential surface thereof and extending in the axial direction, the slot being capable of receiving each one of the pellets;
  (c) a pellet supplying means for intermittently supplying the pellets to the first and second roller means;
  (d) a flaw detecting means capable of detecting flaws of each of the pellets by taking images of the pellets as the pellets are being supported and rotated by the first and the second roller means, and judging existence of flaws on the pellets;
  (e) a sorting means disposed adjacent to the second roller means for receiving the pellets from the second roller means, the sorting means comprises a shutter for selectively proceeding the pellets according to the judgement of the flaw detecting means;
  (f) a first pellet transfer unit provided adjacent to the sorting means for receiving the pellets on which flaw is not detected; and
  (g) a second pellet discard unit provided adjacent to the second roller means underneath thereof for receiving the pellets on which flaws are detected, whereby each of the intermittently supplied pellets is supported by the first and second roller means therebetween so that the axis of the pellet is parallel to the axes of the first and second roller means, rotated about an axis thereof as the first and second roller means rotate, examined regarding the existence of flaws, trapped in the slot of the second roller means, and selectively conveyed into one of the first transfer unit and second pellet discard unit according to the existence of flaws.

11. A pellet handling equipment according to claim 7 which further comprises a dryer means for drying the pellets before the pellets are provided to the first and second roller means.

12. A pellet handling equipment according to claim 11 which further comprises:
  (a) a pellet conveying means for conveying the pellets in a direction parallel to an axis of the pellets;
  (b) a direction switching means for switching a direction of conveyance;
  (c) a primary flaw detecting means for detecting major flaws on the pellets; and
  (d) a primary sorting means for preliminary ejecting the pellets having major flaws.

13. A pellet handling equipment according to claim 12 wherein the direction switching means comprises a tray for arranging the pellets thereon and a handling means for conveying the pellets by holding a surface of the pellets.

14. A pellet handling equipment according to claim 12 wherein the pellets are proceeded in a direction perpendicular to their axis by being rolled on their peripheral surface, the primary flaw detecting means comprising a means for imaging the pellets.

15. A pellet handling equipment according to claim 12 wherein the primary flaw detecting means comprises a disc having ditches formed in a surface thereof for supporting and conveying the pellets thereby, the disc being rotated intermittently at a predetermined angle about an axis thereof, imaging means for imaging both end faces of each of the pellets, and judgement means for judging existence of flaws according the image of the both end faces of the pellets.

16. A pellet handling equipment according to claim 13 wherein the pellets are arrayed parallel to one another on the tray and the pellet handling means holds the pellets by the end faces thereof.

* * * * *